United States Patent [19]

Storms

[11] Patent Number: 5,590,741
[45] Date of Patent: Jan. 7, 1997

[54] SPRING MOTOR ASSEMBLY

[76] Inventor: Wayne W. Storms, 5720 Germany Rd., Verona, N.Y. 13478

[21] Appl. No.: 421,861

[22] Filed: Apr. 14, 1995

[51] Int. Cl.$^6$ .................................................. F03G 1/08
[52] U.S. Cl. ................................................. 185/10; 185/45
[58] Field of Search ................................ 185/9, 10, 11, 185/12, 45

[56] References Cited

U.S. PATENT DOCUMENTS

| | | | |
|---|---|---|---|
| 982,444 | 1/1911 | Smith | 185/9 |
| 1,217,935 | 3/1917 | Gephart. | |
| 1,258,158 | 3/1918 | Sims. | |
| 1,673,197 | 6/1928 | Kollmann | 185/9 |
| 2,493,989 | 1/1950 | Middlestetter | 135/37 |
| 3,732,949 | 5/1973 | Williams | 185/40 R |
| 3,945,453 | 3/1976 | Black | 180/54 R |
| 3,986,580 | 10/1976 | Dennis | 185/9 |

FOREIGN PATENT DOCUMENTS

| | | | |
|---|---|---|---|
| 879865 | 3/1943 | France | 185/9 |
| 60-119385 | 6/1985 | Japan | 185/10 |

*Primary Examiner*—Allan D. Herrmann
*Attorney, Agent, or Firm*—Robert O. Wright

[57] ABSTRACT

A spring motor having a large number of flat spiral wound springs connected in series is shown which allows storage of large amounts of energy in a small amount of cubic space. Only a small force is required for full wind up of the assembly. Energy can be simultaneously stored and withdrawn.

8 Claims, 5 Drawing Sheets

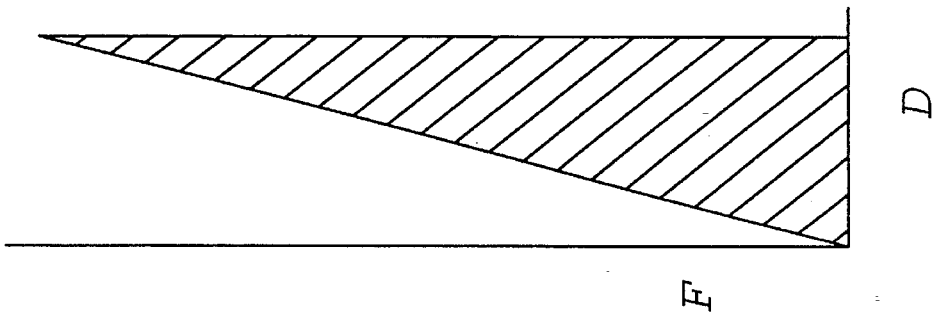
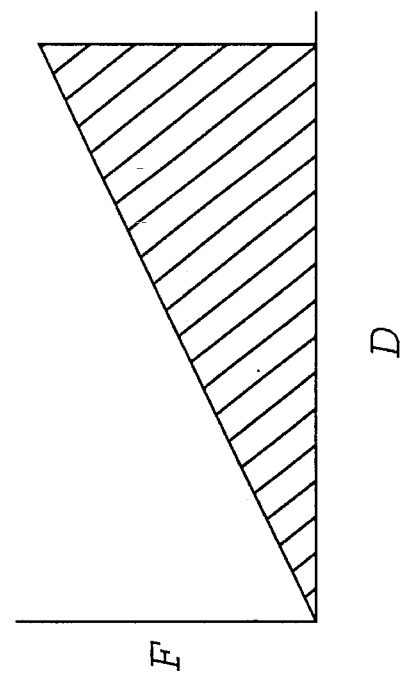
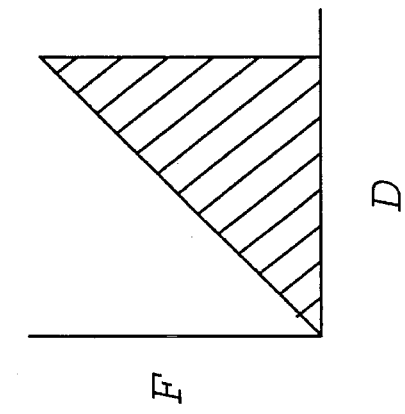
Fig. 5
Fig. 6
Fig. 7

SPRING MOTOR ASSEMBLY

This invention relates to a means for selectively storing and releasing energy to perform a useful function. More particularly this invention relates to a spring motor that can be wound up and unwound selectively and/or simultaneously as required by the application to which the spring motor is put.

BACKGROUND OF INVENTION

Spring motors of various kinds have been proposed as power sources for vehicles and other apparatus since at least the late eighteen hundreds. Typically these devices have involved a number of flat spirally wound springs connected between a frame and a shaft to be driven. Multiple gear trains, clutches, ratchets and brakes have been shown to control the winding up of the springs and the controlled release of the stored energy to the shaft to be driven. Patents of this genre include Gephart U.S. Pat. No. 1,217,935; Sims U.S. Pat. No. 1,258,158; and Middlestetter U.S. Pat. No. 2,493,989.

To obtain enough stored energy large springs such as suggested in Williams U.S. Pat. No. 3,732,949 or multiple springs connected in parallel as in Black U.S. Pat. No. 3,945,453 have been used with their consequent requirement of a large force to wind up the springs. Electric motors geared to provide the necessary force have been suggested for the wind up job. All of the art known to applicant has required large amounts of apparatus and equipment leaving much to be desired in commercial application.

Applicant has solved many of the problems of the prior art by connecting a number of identical flat spirally wound springs in series about a shaft to be driven so as to eliminate the need for expensive and cumbersome gearing, clutches, and winding mechanisms. Energy is stored by winding the first spring in the series while stopping the unwinding of the last spring in the series. All the springs are wound equally in the series with a force equal to the force required to wind just one of the springs. The number of turns required to wind up the series of springs is directly proportional to the number of springs in the series.

OBJECTS AND SUMMARY OF THE INVENTION

Accordingly it is an object of the present invention to provide a spring motor which overcomes the disadvantages of the prior art.

It is another object of the present invention to provide a spring motor capable of storing large amounts of energy in proportion to the cubic space occupied thereby.

It is another object of the present invention to provide a spring motor having a large energy storage capacity that can be fully wound by a small force.

It is another object of the present invention to provide a spring motor that can be easily controlled to release its energy over extended periods of time and/or space.

It is another object of the present invention to provide a spring motor that minimizes friction losses during release of energy.

It is another object of the present invention to provide a spring motor that can be easily wound up simultaneously while it is unwinding and releasing energy to a work load.

These and other and further objects of the present invention are achieved in one embodiment in which a number of pairs, of left and right hand springs, are connected in series for rotation about a support shaft and connected at one end to an input means and at the other end to an output means.

BRIEF DESCRIPTION OF THE DRAWINGS

FIGS. 5–7 are a graphic representation of the energy stored by three different spring configurations.

DESCRIPTION OF THE INVENTION

Figure 1:
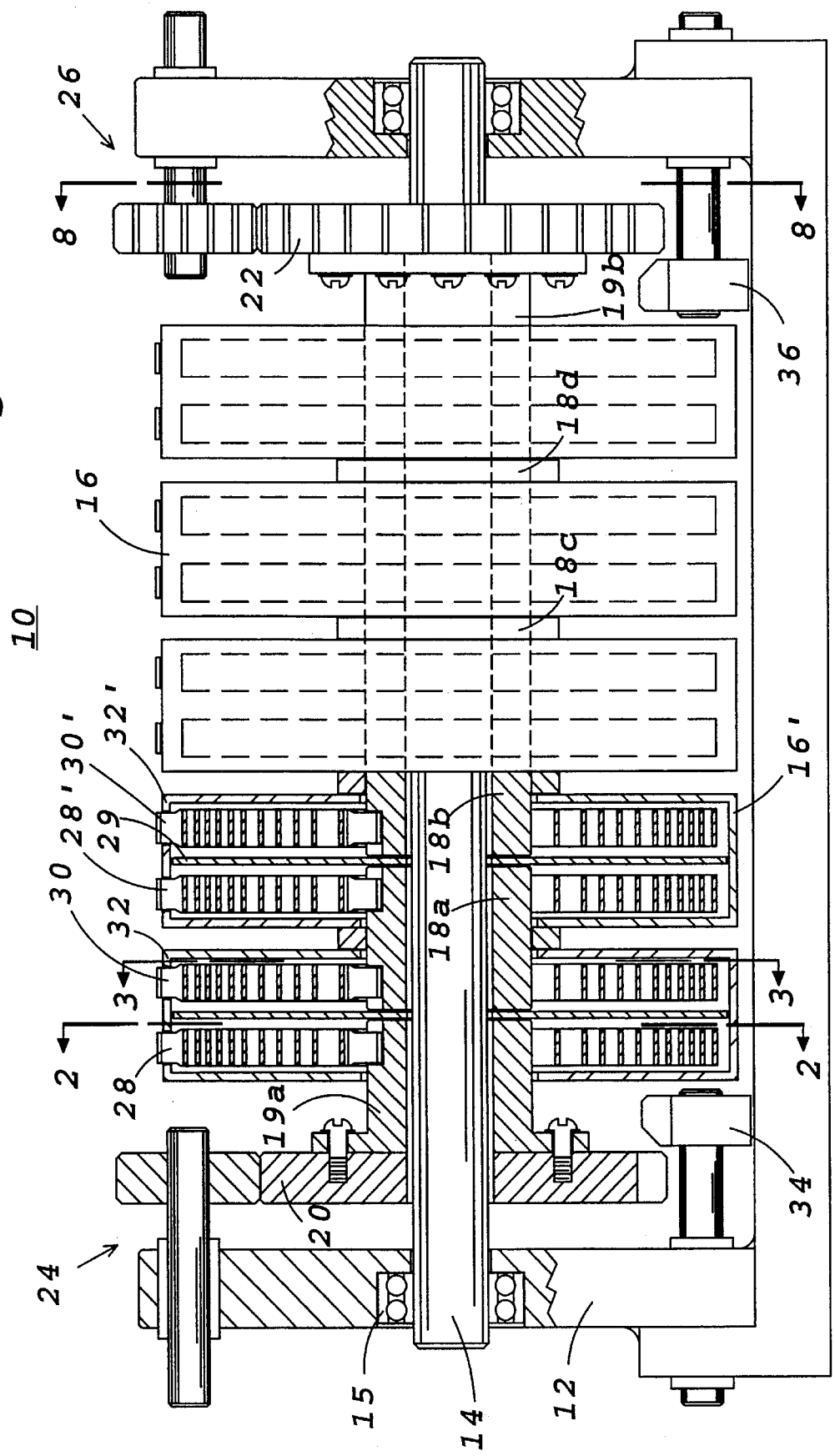
FIG. 1 is a side elevation, partially in section of a device according to the present invention.

Referring now to FIG. 1 there is shown a preferred embodiment of the present invention. Spring motor 10 has a main frame member 12. Support shaft 14 is mounted in bearings 15 in main frame 12 at the ends thereof so as to freely rotate relative to frame 12. Five spring modules 16 are mounted on four bushings 18a–d and two bushings 19a and 19b as will be described in more detail herein. The bushings are mounted on shaft 14 for free rotation thereabout. Drive gear 20 is mounted on a bushing 19a at the input or left end in FIG. 1 and drive gear 22 is mounted on a bushing 19b at the output or right hand end of FIG. 1. Suitable power takeoffs 24 and 26 are mounted at the input and output ends respectively of the motor 10.

Figure 2:
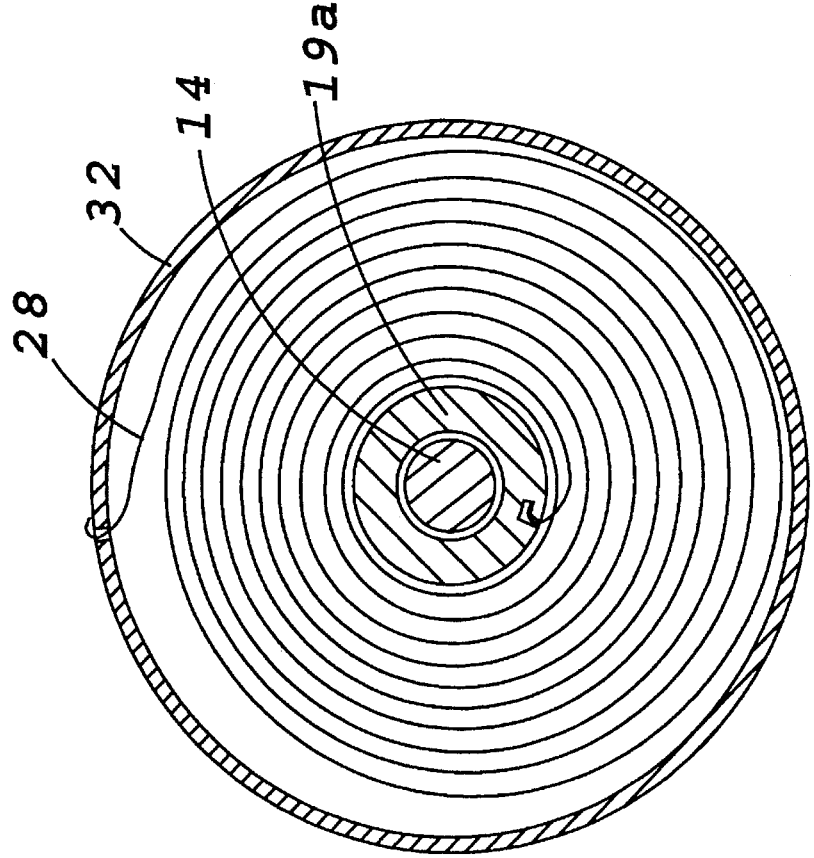
FIG. 2 is a cross section taken on line 2—2 of FIG. 1.

Spring modules 16 each have a pair of springs 28 and 30 enclosed within a housing 32. Springs 28 and 30 can be identical flat spirally wound coil springs having a width somewhat less than one half of the axial length of the bushings 18a–d. Springs of this type are sometimes referred to as "watch" or "clock" springs. The left most spring 28 is mounted on bushing 19a so that clockwise rotation of bushing 19a as seen in FIG. 2 will wind up spring 28. Spring 28 is mounted on the right hand end of the extreme left bushing 19a in FIG. 1.

Figure 3:
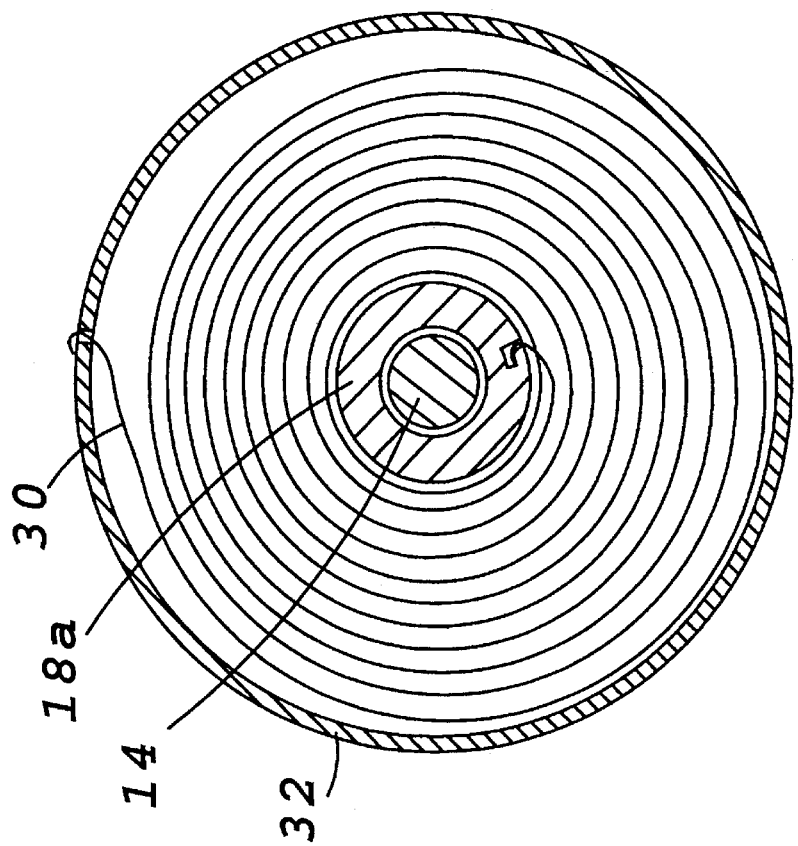
FIG. 3 is a cross section taken on line 3—3 of FIG. 1.

Spring 30 the other spring of the pair in module 16 is mounted opposite to spring 28 so that clockwise rotation of housing 32 (as seen in FIG. 3) will wind up spring 30. Spring 30 is mounted on the left hand end of the next adjacent bushing 18a to bushing 19a. As spring 30 is being wound up clockwise in FIG. 3 by housing 32 it will in turn cause bushing 18a to turn clockwise in FIG. 3 which in turn will tend to wind up spring 28' in the next adjacent module 16'. The sequence is repeated from left to right until all the springs in all the modules are fully wound up. The inner ends of springs 28 and 30 in the left hand module are secured to their respective bushings 19a and 18a and the outer ends of springs 28 and 30 are secured to housing 32 which encloses the pair of springs. A divider plate 29 may be provided between springs 28 and 30 to prevent interference and unnecessary friction therebetween. The springs in each succeeding module 16 are mounted on adjacent bushings 18b–d from left to right in FIG. 1 and the last bushing 19b has mounted on its right hand outboard end drive gear 22. Ratchets 34 and 36 are provided at the input and output ends respectively of frame 12 to selectively engage gears 20 and 22 to prevent rotation thereof relative to frame 12.

It will thus be seen that the entire assembly of modules, bushings, springs and drive gears is free to rotate about support shaft 14 under control of power takeoffs 24 and 26 and ratchets 34 and 36. In operation initially ratchet 34 is released and power takeoff 24 activated to turn bushing 19a in a clockwise rotation (FIG. 2) which will tend to wind up spring 28 in left hand module 16. However, since the other modules and bushings are free to rotate about shaft 14 spring 28 through housing 32 will tend to wind up spring 30. Spring 30 through bushing 18a will tend to wind up spring 28' in the next adjacent module 16' to the right and spring 28' through housing 32' will wind up the next spring 30' mounted on bushing 18b. and so on to the right hand end of the assembly. With ratchet 36 engaged all the springs 28 and 30 in modules 16 will wind up equally from left to right in FIG. 1. While the first spring 28 will tend to wind up first actually all the springs will wind up almost simultaneously. The left hand elements undergo proportionately more revolutions than the more right hand ones. The assembly thus winds up from the center of the left hand first spring to the outer end of the first spring to the outer end of the second spring to the inner end of the second spring to the inner end of the third spring to the outer end of the third spring etc. to the end of the assembly. Power takeoffs 24 and 26 are representative of variable transmissions that would be used in applications of my spring motor and energy storage system to match the output loads and the inputs available at any given time.

If all the springs are identical and ignoring friction it will take ten times as many revolutions of gear 20 to wind up the complete assembly as it would to windup the first spring 28 alone. Similarly if ratchet 34 is engaged and ratchet 36 released it will take ten times as long for the ten springs to unwind as it would for the first spring 28 alone to unwind. This is shown graphically in FIG. 5–7 where FIG. 5 represents a single spring wound by a force F over a distance D and FIG. 6 represents ten springs, connected in series, wound by the same force F over the distance 10D. The area underneath the curves represents the energy stored in the springs. FIG. 7 represents ten springs connected in parallel and wound by a force 10F over a distance D.

It will thus be apparent that with applicants construction the energy stored in the springs will be available over a longer time span and in a more manageable form. Also the need for separate clutch and brake assemblies and spring winding mechanisms for each individual spring is eliminated unlike the prior art such as Black supra. Thus by choosing the number and size of springs connected in the above manner I am able to obtain a customized, flexible energy storage device with greater efficiency both from a friction and cubic space standpoint than heretofore available in the prior art known to me.

While I have described the operation of the motor 10 with either ratchet 34 or 36 engaged and the other free, it is entirely possible with the foregoing construction to be both winding and unwinding the spring motor 10 simultaneously. Under some circumstances it may be desirable to introduce energy through power takeoff 24 while also withdrawing energy through power takeoff 26. The end result may be a plus or minus in stored energy depending on the amount and duration of the input and output.

Figure 8:
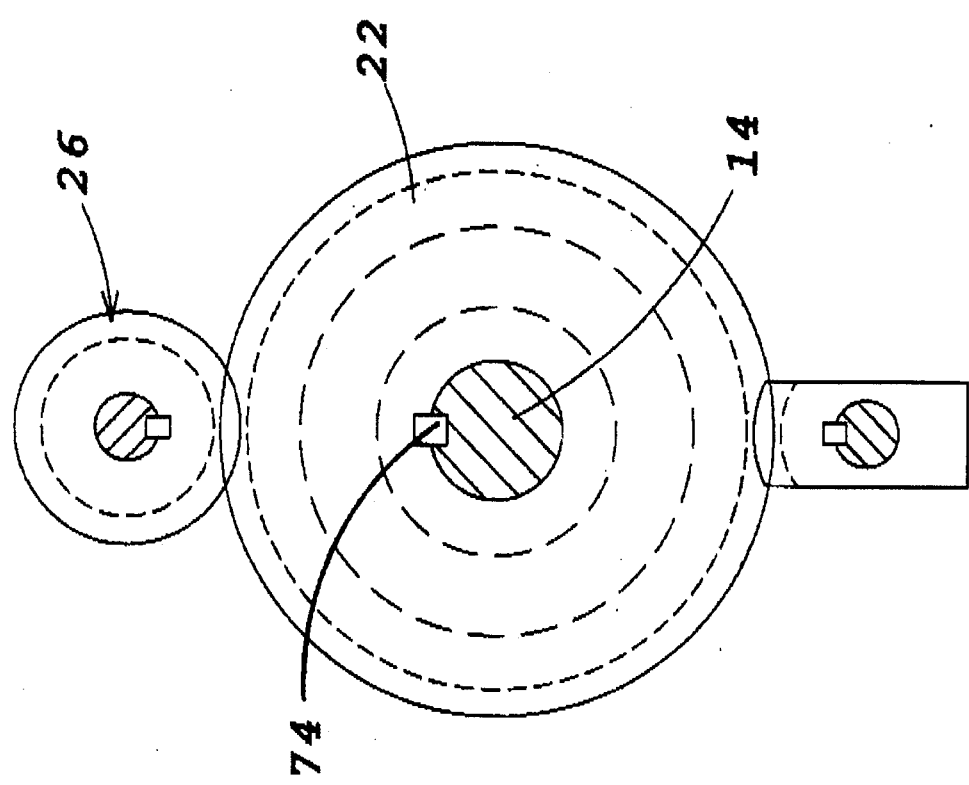
FIG. 8 is a cross sectional view taken on line 8—8 of FIG. 1 showing an alternative construction in which gear 22 is keyed to shaft 14.

Referring again to FIG. 1 in another embodiment of the present invention the right hand end bushing 19b and drive gear 22 are fixed to support shaft 14 by key 74 as shown in FIG. 8. Thus when it is desired to release energy to drive some external mechanism, shaft 14 will rotate along with bushing 19b and the other intermediate bushings and modules. It will be understood that with ratchet 34 engaged and ratchet 36 released the assembly will tend to unwind from right to left in FIG. 1 as the springs within the modules unwind. Actually all the springs unwind almost simultaneously with the right hand elements undergoing more revolutions than the left hand ones. Power may again be taken out through takeoff 26 if desired.

Another advantage of this embodiment is that any internal frictional losses in the modules and between the bushings and support shaft will be eliminated in that they will now help to drive shaft 14 as the springs unwind and be transferred to the output through gears 22 and power takeoff 26. Any such losses will still be encountered in the wind up phase but they are in effect recouped in the output phase.

Figure 4:
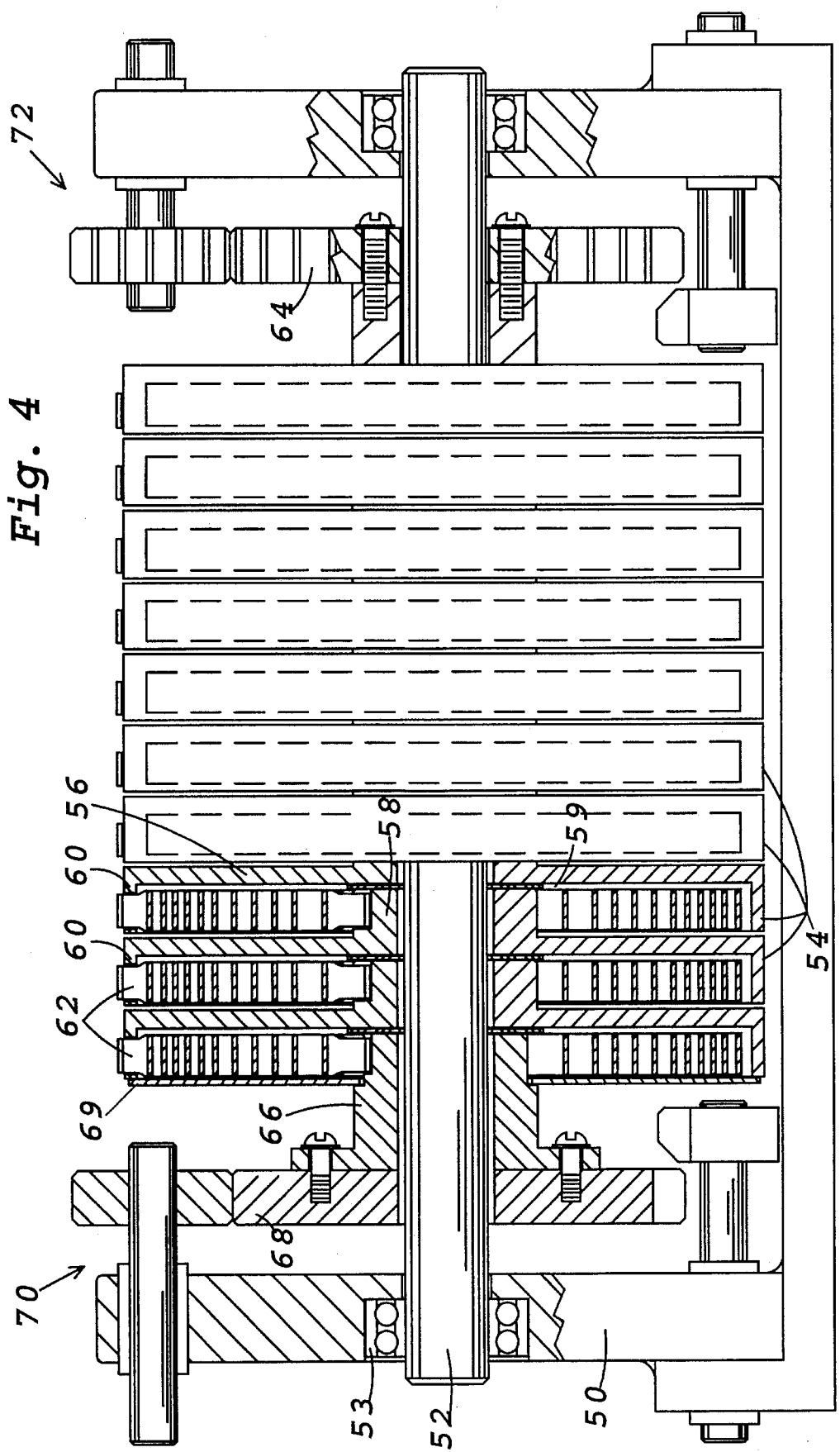
FIG. 4 is a view similar to FIG. 1 partially in section of another embodiment of the present invention.

Referring now to FIG. 4 there is shown another embodiment of the present invention. In this construction a main frame 50 has a support shaft 52 rotatably mounted in bearings 53. Nine annular sleeve and disc members 54 are rotatably mounted on shaft 52 in end to end relationship. Sleeve members 54 have a circular disc 56 at one edge of a central flange 58 and a fastening arm 60 at one point on the circumference of disc 56 which extends out from the other side of disc 56 from flange 58. Arm 60 is parallel to the bore of flange 58 and adapted to engage the outer end of a spring 62. Anti friction bushings 59 may be provided between members 54 if desired.

Each sleeve member 54 has mounted thereon a spring 62 with the inner end fixed to the flange 58. Spring 62 is similar to springs 28 and 30 but all springs 62 are oriented for winding up in the same direction. The outer end of each spring 62 is secured about fastening arm 60 of the next adjacent sleeve member 54 as shown in FIG. 4. As shown in FIG. 4 the extreme right hand sleeve 54 has no spring mounted thereon but rather output gear 64. Extreme left hand spring 62 is mounted on a bushing 66 which also has fixed thereto input gear 68 and cover member 69. Input and output takeoffs 70 and 72 are provided similarly to FIG. 1.

Again the embodiment of FIG. 4 may be modified to fix output gear 64 to shaft 52 to reduce friction as described in reference to the alternative embodiment of FIG. 1.

I have shown and described above five modules of two springs each or ten individual springs constituting a spring motor. It should be understood any number of modules and/or individual springs may be connected in series in accordance with the present invention to provide the desired amount of stored energy and force required for a particular application.

While this invention has been explained with reference to the structures disclosed herein, it is not confined to the details as set forth and this application is intended to cover any modifications and changes as may come within the scope of the following claims.

What is claimed:

1. A spring motor assembly for selectively storing and releasing energy to power an apparatus including a main supporting frame member;

a support shaft having first and second ends rotatably mounted in said frame member;

a plurality of individual springs positioned along said support shaft between said first and second ends thereof for rotary movement thereabout;

means interconnecting said plurality of individual meanings in series relationship comprising;

a plurality of modules;

each module having first and second springs;

each module having an input member connected to the center of said first spring;

each module having an output member connected to the center of said second spring;

the outer ends of said first and second springs in each module being connected together; and said output member of each module being adapted to become the input member of a next adjacent module and be connected to the first spring of a next adjacent module;

first drive means mounted on said support shaft adjacent said first end thereof and operatively connected to one end of said plurality of modules adjacent said first end of said support shaft;

second drive means mounted on said support shaft adjacent said second end of said support shaft and operatively connected to another end of said plurality of modules adjacent said second end of said support shaft; and control means operatively connected to said first and second drive means for selectively introducing and withdrawing energy from said plurality of serially connected springs.

2. A spring motor assembly as claimed in claim 1 wherein one of said module input members is connected to said first drive means and one of said module output members is connected to said second drive means.

3. A spring motor assembly as claimed in claim 1 wherein said first and second springs in each module are positioned on said support shaft so that one spring of the module will be wound up by a clockwise motion of said input member and the other of said first and second springs will be wound up by a counter clockwise motion of said output member relative to said support shaft.

4. A spring motor assembly as claimed in claim 1 wherein said second drive means is fixed on said support shaft.

5. A spring motor assembly for selectively storing and releasing energy to power an apparatus which comprises:

a main supporting frame member;

a support shaft having first and second ends rotatably mounted in said frame member;

a plurality of individual springs positioned along said support shaft between said first and second ends thereof for rotary movement thereabout;

means interconnecting said plurality of individual springs in series relationship;

first drive means mounted on said support shaft adjacent said first end thereof and connected to one end of the first spring of said plurality of series connected springs adjacent said first end of said support shaft;

second drive means mounted on said support shaft adjacent said second end of said support shaft and connected to one end of the last spring of said plurality of series connected springs adjacent said second end of said support shaft;

control means operatively connected to said first and second drive means for selectively introducing and withdrawing energy from said plurality of serially connected springs;

a plurality of cylindrical bushings rotatably mounted on said support shaft in end to end relationship;

each of said bushings having an axial length sufficient to accommodate two individual springs being mounted thereon;

said plurality of individual springs being positioned about and along said support shaft to cause a first set of alternate springs to be wound by a clockwise motion of said bushings and a second set of alternate springs to be wound by a counter-clockwise motion of said bushings;

said first and second sets of springs being interleaved along said support shaft;

each of said bushings intermediate the end bearings having the inner end of a clockwise wound and a counter-clockwise wound spring mounted thereon;

the outer end of each spring mounted on said bushings being connected to the outer end of the spring on the next adjacent bushing so as to sequentially connect said plurality of springs from said first end to said second end of said support shaft;

the end bushing adjacent said first end of said support shaft being connected to said first drive means and having one spring only mounted thereon with the inner end of said spring connected thereto;

the end bushing adjacent said second end of said support shaft being connected to said second drive means and having one spring only mounted thereon with the inner end of said spring connected thereto;

whereby said entire assembly of springs and bushings is free floating about said support shaft.

6. A spring motor assembly as claimed in claim 5 wherein said second drive means is fixed to said support shaft.

7. The method of storing energy for use in powering a mechanism which comprises:

forming a plurality of modules each having a pair of spring members therein each having first and second ends;

connecting the second end of said pair of spring members together;

connecting a first end of each of said pair of spring members to a first end of spring members in adjacent modules to form an assembly having an assembly having an assembly input end and an assembly output end;

connecting a first end of one spring in an end module to form said assembly input end;

connecting a first end of one spring in an end module to form said output end;

selectively introducing energy into said assembly input end of said connected springs;

selectively taking out energy from said assembly output end; and controlling said assembly input and output ends of said connected springs to cause said springs to store and release energy.

8. The method of claim 7 further including connecting said pair of spring members in said modules so that one spring will wind up by clockwise rotation and the other spring will wind up by counter-clockwise rotation of said first ends of said springs.

* * * * *